(12) United States Patent
Paluncic et al.

(10) Patent No.: US 8,196,489 B2
(45) Date of Patent: Jun. 12, 2012

(54) LUBRICATING DEVICE WITH LUBRICATING PINION

(75) Inventors: Zdravko Paluncic, Ludwigshafen (DE); Andreas Schöenfeld, St. Leon-Rot (DE)

(73) Assignee: Lincoln GmbH, Walldorf (DE)

( * ) Notice: Subject to any disclaimer, the term of this patent is extended or adjusted under 35 U.S.C. 154(b) by 632 days.

(21) Appl. No.: 12/300,842

(22) PCT Filed: Apr. 26, 2007

(86) PCT No.: PCT/EP2007/003666
§ 371 (c)(1),
(2), (4) Date: May 1, 2009

(87) PCT Pub. No.: WO2007/131604
PCT Pub. Date: Nov. 22, 2007

(65) Prior Publication Data
US 2010/0000358 A1 Jan. 7, 2010

(30) Foreign Application Priority Data
May 16, 2006 (DE) .................... 20 2006 007 831 U
Jul. 20, 2006 (DE) .................... 20 2006 011 330 U

(51) Int. Cl.
*F16H 57/04* (2010.01)
(52) U.S. Cl. ........................................ 74/468
(58) Field of Classification Search ............ 74/467, 74/468, 462; 184/6.12
See application file for complete search history.

(56) References Cited

U.S. PATENT DOCUMENTS

| | | | | |
|---|---|---|---|---|
| 1,194,904 A | * | 8/1916 | Wagner | 74/462 |
| 3,424,022 A | * | 1/1969 | Greenberg et al. | 74/409 |
| 3,822,607 A | * | 7/1974 | Tharaldsen | 74/468 |
| 5,489,090 A | | 2/1996 | Leger | |
| 5,622,239 A | | 4/1997 | Orlitzky | |

FOREIGN PATENT DOCUMENTS

| | | |
|---|---|---|
| DE | 10129089 A1 | 4/2003 |
| DE | 20121923 U1 | 9/2003 |
| DE | 202007004103 U1 | 6/2007 |
| GB | 1209792 | 10/1970 |
| GB | 1209792 A | 10/1970 |
| JP | 2003207028 | 7/2003 |
| TW | 253861 | 11/1982 |
| WO | 2008113396 A1 | 9/2008 |

OTHER PUBLICATIONS

Taiwanese Office Action regarding 096114896, 4 pgs.
Taiwanese International Search Report regarding 096114896, 1 pg.
English translation of International Preliminary Report on Patentability mailed Jan. 29, 2009, 10 pages.
Office action dated Oct. 11, 2011 regarding U.S. Appl. No. 12/528,743, 15 pages.

* cited by examiner

*Primary Examiner* — Richard W Ridley
*Assistant Examiner* — Phillip A Johnson
(74) *Attorney, Agent, or Firm* — Senniger Powers LLP

(57) ABSTRACT

Described is a lubricating device with at least one lubricating pinion for applying a lubricant, in particular grease, which is for example fed through a lubricant line by a lubricant pump from a reservoir, to at least one gearwheel or the like, wherein the lubricating pinion has an outer toothing into which at least one lubricant outlet opens out. The teeth of the outer toothing of the lubricating pinion have a shortened tooth flank profile in relation to an involute toothing, wherein the addendum and/or the width of the tooth flanks in the peripheral direction are reduced in a tooth flank section which is situated radially outside the reference circle.

13 Claims, 3 Drawing Sheets

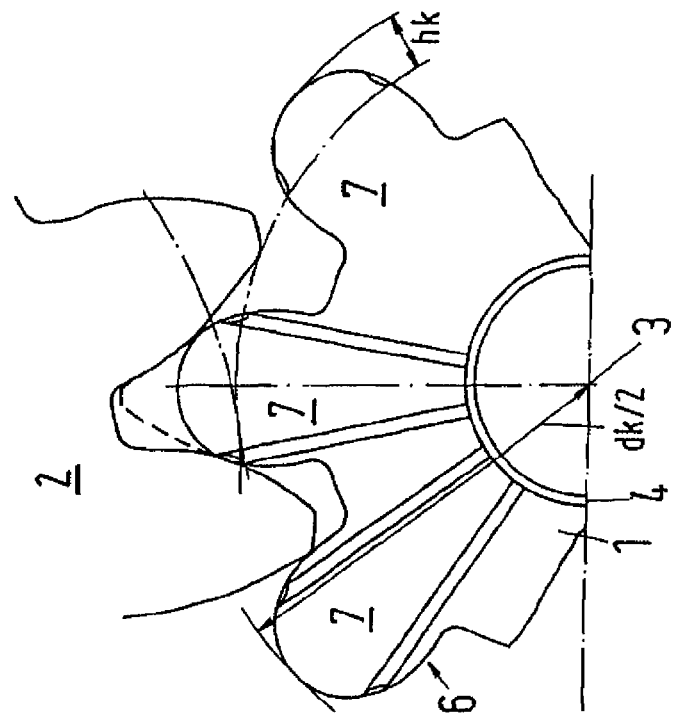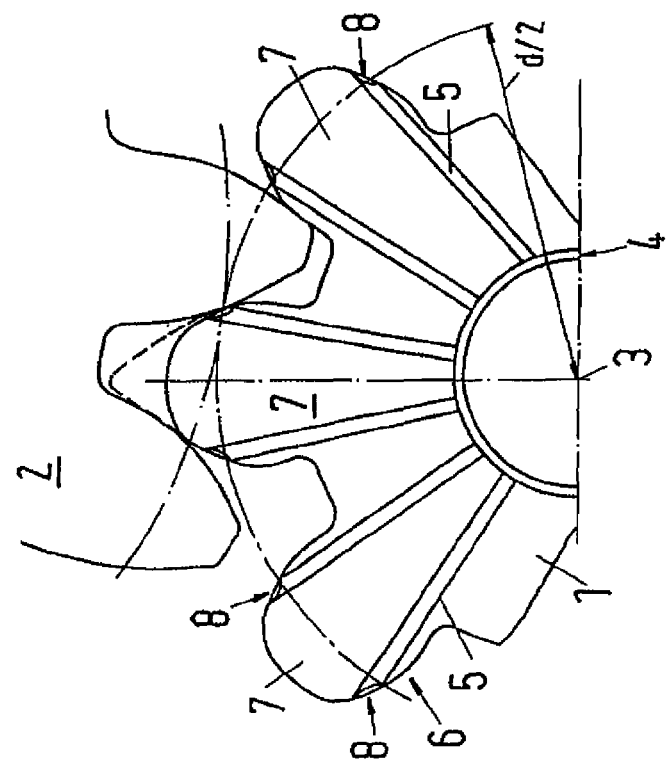

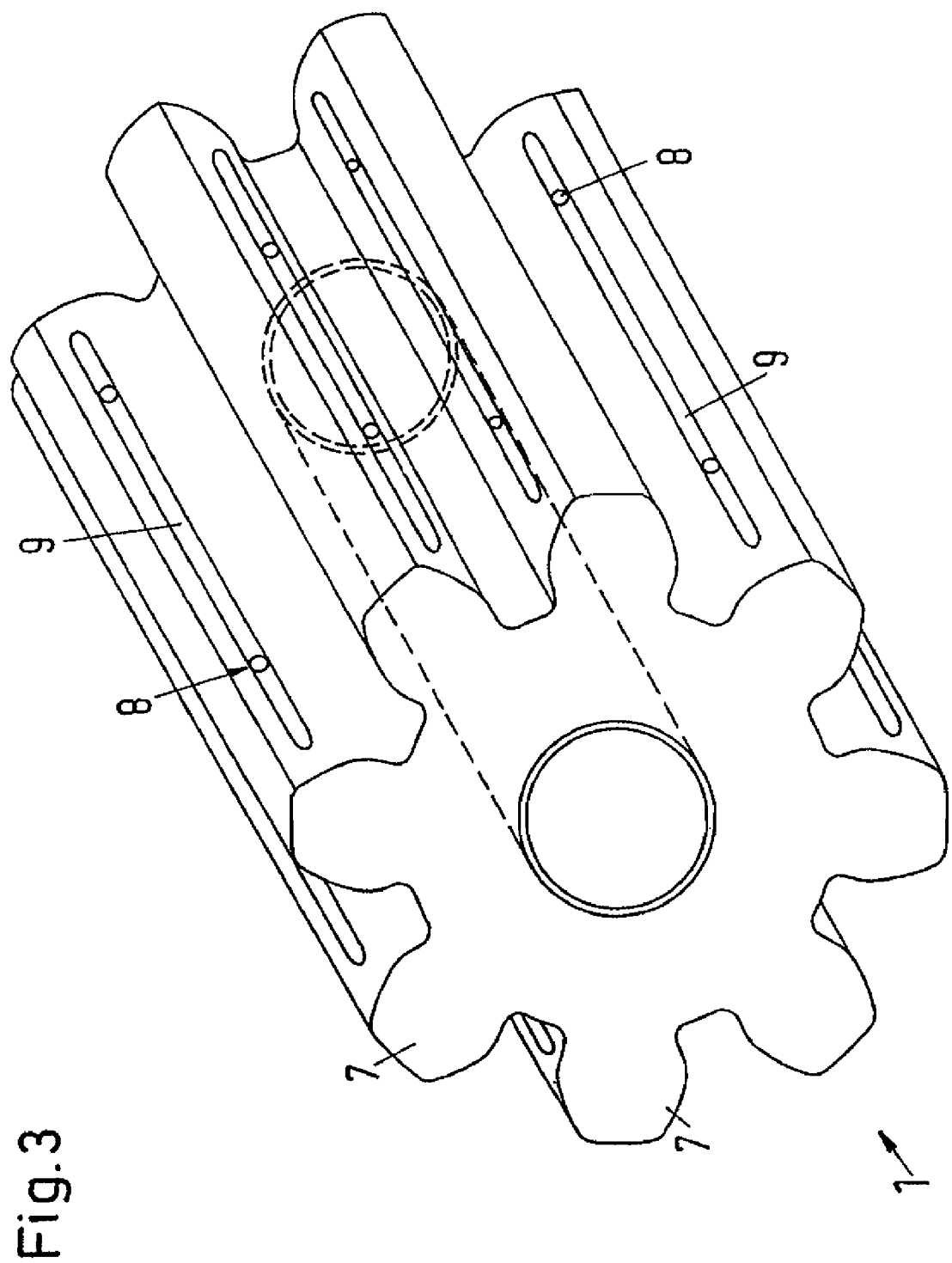

LUBRICATING DEVICE WITH LUBRICATING PINION

BACKGROUND OF THE INVENTION

The invention pertains to a lubricating device with at least one lubricant transfer pinion for applying onto at least one gearwheel a lubricant, particularly grease that is transported, for example, from a reservoir through a lubricant conduit by a lubricant pump, wherein the lubricant transfer pinion features external teeth with at least one lubricant outlet.

A device of this type for lubricating gearwheels is known, for example, from DE 201 21 923 U1. The lubricant transfer pinion that is referred to as a crown gear module in this publication has the external contour of a conventional gearwheel with involute toothing. When this known lubricant transfer pinion meshes with a gearwheel to be lubricated, the tip area of the teeth of the lubricant transfer pinion that lies radially outside the reference circle engages into the base area of the teeth of the gearwheel to be lubricated that lies radially inside the reference circle. Consequently, the lubricant is irregularly and unevenly applied onto the gearwheel to be lubricated and, in particular, accumulates in the base area of the teeth of the gearwheel to be lubricated. In addition, the lubricant supply is sometimes insufficient in the area of the contacting tooth flanks that is subjected to high tribological stresses.

SUMMARY OF THE INVENTION

The present invention, in contrast, is based on the problem of making available a lubricating device of the above type that has a very simple design and makes it possible to achieve an improved distribution of the lubricant on a gearwheel to be lubricated.

According to the invention, this problem is essentially solved in that the teeth of the external toothing of the lubricant transfer pinion have a tooth flank profile that is shortened in comparison to an involute toothing, wherein the addendum and/or the width of the tooth flanks in the circumferential direction are reduced in a tooth flank section that lies radially outside the reference circle. In order to reduce the addendum, it is proposed to reduce, in particular, the thus far existing tip of the tooth. In this case, the addendum is defined as half the difference between the outside diameter of the lubricant transfer pinion and the reference diameter of the lubricant transfer pinion. In other words, the addendum refers to the height of the area of each tooth that protrudes radially outward over the reference circle. In an involute toothing, this is usually a pointed tooth area. If this addendum is reduced in comparison to the addendum of an involute toothing, the depth of penetration of the teeth of the lubricant transfer pinion into the base area of the gearwheel to be lubricated is reduced. It was surprisingly determined that this results in a significantly improved distribution of the lubricant in the areas that are subjected to higher tribological stresses and prevents the undesirable accumulation of the lubricant in the base area of the gearwheel to be lubricated. This applies analogously to a reduction of the width of the tooth flanks in the circumferential direction in a tooth flank section that lies radially outside the reference circle, and therefore also makes it possible to prevent an irregular and uneven application of the lubricant onto the gearwheel to be lubricated and, in particular, the accumulation thereof in the base area of the teeth of gearwheel to be lubricated.

In one embodiment, this invention is directed to a gear assembly comprising at least one gearwheel having an involute toothing, and a lubricating device with at least one lubricant transfer pinion for applying lubricant onto the at least one gearwheel. The lubricant transfer pinion has an external toothing in which at least one lubricant outlet is arranged. The lubricant transfer pinion of the lubricating system meshes with the at least one gearwheel. The teeth of the external toothing of the lubricant transfer pinion have a tooth flank profile that is shortened in comparison to the an involute toothing profile, and an addendum and/or a width of the tooth flanks in the circumferential direction are reduced in a tooth flank section that lies radially outside a reference circle.

One embodiment of the invention is described in greater detail below with reference to the drawings. In this respect, all described and/or graphically illustrated characteristics form the object of the invention individually or in any combination, regardless of their combination in the claims or their reference to other claims.

BRIEF DESCRIPTION OF THE DRAWINGS

In the schematic drawings:

FIG. 1 shows a part of an inventive lubricant transfer pinion that meshes with a gearwheel to be lubricated;

FIG. 2 shows the lubricant transfer pinion that meshes with the gearwheel to be lubricated, in a position in which it is additionally turned in comparison to FIG. 1;

FIG. 3 shows a perspective representation of the lubricant transfer pinion according to FIG. 1.

DETAILED DESCRIPTION

Figure 4:
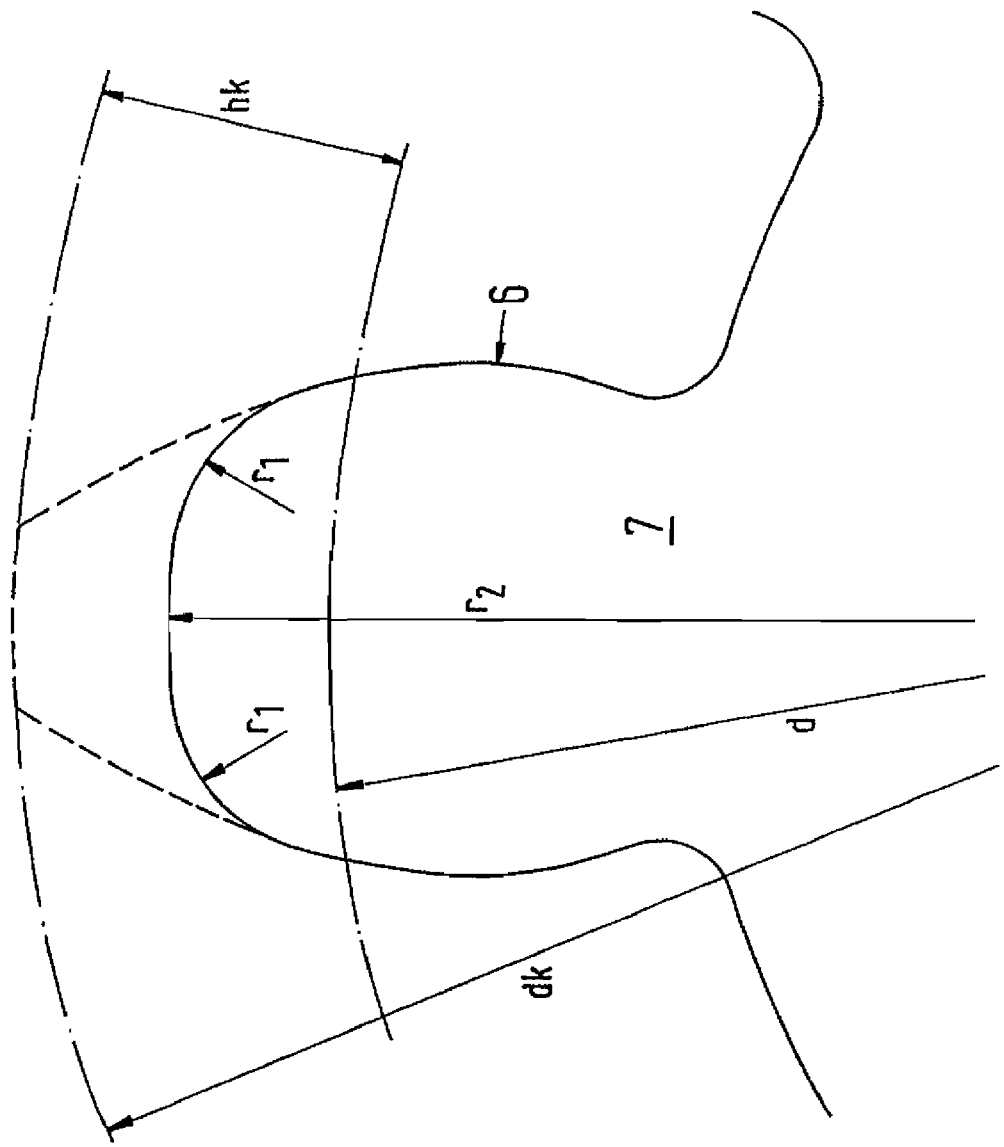
FIG. 4 shows a section of an inventive lubricant transfer pinion.

The figures show parts of a lubricant transfer pinion 1 of a lubricating device that has a reference diameter d. The lubricant transfer pinion 1 meshes with a gearwheel 2 to be lubricated that features an involute toothing and also is only illustrated in part in the figures.

A lubricant supply line 4 is arranged in the area of the axis 3 of the lubricant transfer pinion 1, wherein lubricant conduits 5 that extend substantially in the radial direction originate at said lubricant supply line and each lead into a respective lubricant outlet 8 in the tooth flanks 6 of the teeth 7 of the lubricant transfer pinion 1. According to FIG. 1, the lubricant outlets 8 lie substantially in the area of the reference circle. In FIG. 1, the lubricant outlet of the lubricant transfer pinion 1 arranged in the right tooth flank contacts the gearwheel 2 to be lubricated, whereas the lubricant transfer pinion 1 in FIG. 2 was additionally turned in the clockwise direction such that the lubricant outlet 8 of the lubricant transfer pinion 1 arranged in the left tooth flank contacts the gearwheel 2 to be lubricated.

The tip contour of the teeth of the lubricant transfer pinion 1 is illustrated with continuous lines in the figures. The central tooth of the lubricant transfer pinion 1 in the figures shows the tip contour of the teeth of the lubricant transfer pinion for a theoretical profile of an involute toothing with a broken line. A comparison of the continuous line to the broken line clearly shows that the tip contour of the teeth and the tooth height of the lubricant transfer pinion 1 are altered in comparison to the theoretical profile of an involute toothing.

The addendum hk of the teeth 7 of the lubricant transfer pinion 1 is reduced in comparison to the theoretical profile of an involute toothing. In this case, the addendum is defined as half the difference between the outside diameter dk of the lubricant transfer pinion 1 and the reference diameter d of the lubricant transfer pinion 1. In the embodiment shown, the addendum of the teeth 7 of the lubricant transfer pinion 1 only corresponds to a value of about 0.2 to about 0.7 of the addendum of the theoretical profile of an involute toothing. The teeth 7 of the lubricant transfer pinion 1 penetrate into the base area between the teeth of the gearwheel 2 to be lubricated to a significantly reduced depth.

In addition, the tip contour of the teeth 7 of the lubricant transfer pinion 1 is altered in comparison to the usual pointed involute toothing, namely to a rounded tip contour in the embodiment shown. This also causes lubricant to be discharged substantially on the tooth flanks of the gearwheel 2 to be lubricated in the area of the reference circle, namely without accumulating in the base area of the gearwheel 2 to be lubricated. The lubricant is discharged from the lubricant outlets 8 into axial channels 9 or transverse grooves illustrated in FIG. 3 in order to distribute the lubricant over the width of the lubricant transfer pinion 1.

FIG. 4, in particular, shows that the tip contour of the teeth 7 of the lubricant transfer pinion 1 is defined by a larger central radius $r_2$ that transforms into a smaller radius $r_1$ on each side in the embodiment shown. The width of the tooth flanks in the circumferential direction is reduced only in a tooth flank section that lies radially outside the reference circle. Due to this profile of the teeth 7 of the lubricant transfer pinion 1 that is corrected in comparison to the theoretical profile illustrated with broken lines with respect to the addendum, as well as with respect to the width of the tooth flanks in the circumferential direction, the lubricant such as lubricating grease is prevented from being carried away such that particularly the tooth flanks of the gearwheel 2 to be lubricated are supplied with lubricant.

It will be observed from the foregoing that the addendum of the teeth of the lubricant transfer piston 1 is reduced in comparison to an involute toothing by about 25% to about 90%, particularly by about 50% to about 80%. It was determined that it is particularly advantageous if the teeth of the external toothing of the lubricant transfer pinion have an addendum that is reduced in comparison to an involute toothing by about 75%. In other words, the addendum now amounts to only about 25% of the theoretical profile of an involute toothing. In this case, the teeth of the lubricant transfer pinion are only shortened in the area that lies radially outside the reference circle, because a shortening of the teeth to a value that lies below the reference circle would result in the lubricant transfer pinion no longer being driven by the gearwheel to be lubricated.

However, it is also possible that the teeth of the external toothing of the lubricant transfer pinion have a tooth height that is reduced in comparison to an involute toothing by about 25% to 50%, wherein the external toothing may have an addendum that is reduced, in particular, by about 25%.

The inventively corrected profile with a reduced addendum may also be altered in comparison to an involute toothing with respect to the contour of the external toothing. For example, the teeth of the external toothing of the lubricant transfer pinion may have a rounded contour. This may be realized, for example, with a larger radius in the area of the tip of the tooth that respectively transforms laterally into smaller radii. The teeth of the external toothing of the lubricant transfer pinion may have such a rounded contour that the width of the tooth flanks in the circumferential direction in a tooth flank section that lies radially outside the reference circle is reduced in comparison to an involute toothing.

Alternatively, it would also be possible, to configure the tip contour of the teeth of the external toothing of the lubricant transfer pinion in any desired other way. For example, it may also have a pointed contour and be realized, in particular, similar to the tip contour of an involute toothing.

In order to evenly and adequately supply the gearwheel to be lubricated with lubricant, the lubricant transfer pinion preferably features several lubricant conduits that originate at a lubricant supply line and respectively lead into at least one lubricant outlet in one of the teeth. The lubricant supply line may be connected to a reservoir via a lubricant pump and, according to one preferred embodiment of the invention, arranged in the area of the axis of the lubricant transfer pinion or an area near the axis of the lubricant transfer pinion.

According to a refinement of this embodiment, it is proposed that at least two lubricant outlets are arranged in each tooth of the lubricant transfer pinion. This makes it possible to supply lubricant to each tooth of the gearwheel to be lubricated.

In order to supply lubricant to both tooth flanks of each tooth of the gearwheel to be lubricated, at least one lubricant outlet is provided in each tooth flank of the lubricant transfer pinion in another embodiment of the invention.

The lubricant transfer pinion may at least partially consist of metal or be at least partially manufactured of plastic. The lubricant transfer pinion and the gearwheel to be lubricated may also consist of different materials.

If the outlet openings of the lubricant transfer pinion are arranged in the tooth flanks in the area of the reference circle and/or in an area between the reference circle and the root circle, it is ensured that the locations of the gearwheel to be lubricated that are subjected to the highest tribological stresses are lubricated.

The outlet openings in the tooth flanks preferably lead into transverse grooves or channels that extend in the axial direction of the lubricant transfer pinion and over almost the entire axial width of the tooth flanks. This results in the lubricant being distributed over essentially the entire width of the lubricant transfer pinion and of the gearwheel to be lubricated.

The invention further pertains to a gear assembly with at least one gearwheel to be lubricated, and and wherein the lubricant transfer pinion of the lubricating system meshes with at least one gearwheel. In this case, the present invention is not limited to the lubrication of a gearwheel that is realized in the form of a cylindrical gear, but may also be used for bevel gears, helical gearwheels, crown wheels, endless screws, toothed racks or elliptical gearwheels that respectively mesh with the lubricant transfer pinion.

LIST OF REFERENCE SYMBOLS:

1. Lubricant transfer pinion
2. Gearwheel to be lubricated
3. Axis
4. Lubricant supply line
5. Lubricant conduit
6. Tooth flank
7. Tooth
8. Lubricant outlet
9. Channel
d Reference diameter
dk Outside diameter
hk Addendum
$r_1$ Smaller radius
$r_2$ Larger radius

What is claimed is:

1. A gear assembly comprising at least one gearwheel having an involute toothing, and a lubricating device with at least one lubricant transfer pinion for applying a lubricant onto the at least one gearwheel, wherein the lubricant transfer pinion has an external toothing in which at least one lubricant outlet is arranged, and wherein the at least one lubricant transfer pinion meshes with the at least one gearwheel, characterized by the fact that only the teeth of the external toothing of the at least one lubricant transfer pinion have a tooth flank profile that is shortened in comparison to an involute toothing profile, and wherein an addendum of the tooth flanks of the teeth are reduced in a tooth flank section that lies radially outside a reference circle.

2. The gear assembly according to claim 1, characterized by the fact that the addendum of the teeth of the external toothing of the at least one lubricant transfer pinion is reduced in comparison to said involute toothing profile by 25% to 90%.

3. The gear assembly according to claim 2, characterized by the fact that the addendum of the teeth of the external toothing of the at least one lubricant transfer pinion is reduced in comparison to said involute toothing profile by 50% to 80%.

4. The gear assembly according to one of claims 1-3, characterized by the fact that the teeth of the external toothing of the at least one lubricant transfer pinion have a rounded tip contour comprising three radii.

5. The gear assembly according claim 4, characterized by the fact that the teeth of the external toothing of the at least one lubricant transfer pinion have a rounded tip contour such that a width between the tooth flanks of the teeth in a circumferential direction is reduced in comparison to said involute toothing profile in the tooth flank section that lies radially outside the reference circle.

6. The gear assembly according to claim 1, characterized by the fact that the teeth of the external toothing of the at least one lubricant transfer pinion have a rounded tip contour such that a width between the tooth flanks of the teeth in a circumferential direction is reduced in comparison to an involute toothing in a tooth flank section that lies radially outside the reference circle.

7. The gear assembly according to claim 1, characterized by the fact that the at least one lubricant transfer pinion comprises several lubricant conduits that originate at a lubricant supply line arranged on a rotational axis of the at least one lubricant transfer pinion or in an area near the rotational axis and respectively lead into said at least one lubricant outlet in one of the teeth.

8. The gear assembly according to claim 1, characterized by the fact that at least two lubricant outlets are arranged in each tooth of the at least one lubricant transfer pinion.

9. The gear assembly according to claim 8, characterized by the fact that the at least two lubricant outlets are connected by a transverse groove or a channel that extends over almost an entire width of the tooth flanks in an axial direction with respect to the at least one lubricant transfer pinion.

10. The gear assembly according to claim 8, characterized by the fact that at least one lubricant outlet leads into each tooth flank of the at least one lubricant transfer pinion.

11. The lubricating device according to one of claims 1-3, characterized by lubricant outlets, including said at least one lubricant outlet, in an area of the pitch circle and/or in an area between the pitch circle and the root circle, lead into the tooth flanks of the at least one lubricant transfer pinion.

12. The gear assembly according to claim 1, characterized by the fact that the external toothing of the at least one lubricant transfer pinion comprises a rounded contour with a tip area having a larger radius that transitions laterally into smaller radii.

13. The gear assembly according to claim 1, characterized by the fact that a width between the tooth flanks of the teeth in the circumferential direction is reduced in the tooth flank section that lies radially outside the reference circle.

* * * * *